March 10, 1964   E. R. ANDREGG ET AL   3,124,659
CARD DIALER

Filed Oct. 2, 1959   11 Sheets-Sheet 1

INVENTORS
E. R. ANDREGG
W. PFERD
R. R. STOKES

BY *Joseph C. Redmond, Jr.*
ATTORNEY

March 10, 1964   E. R. ANDREGG ET AL   3,124,659
CARD DIALER
Filed Oct. 2, 1959   11 Sheets-Sheet 2
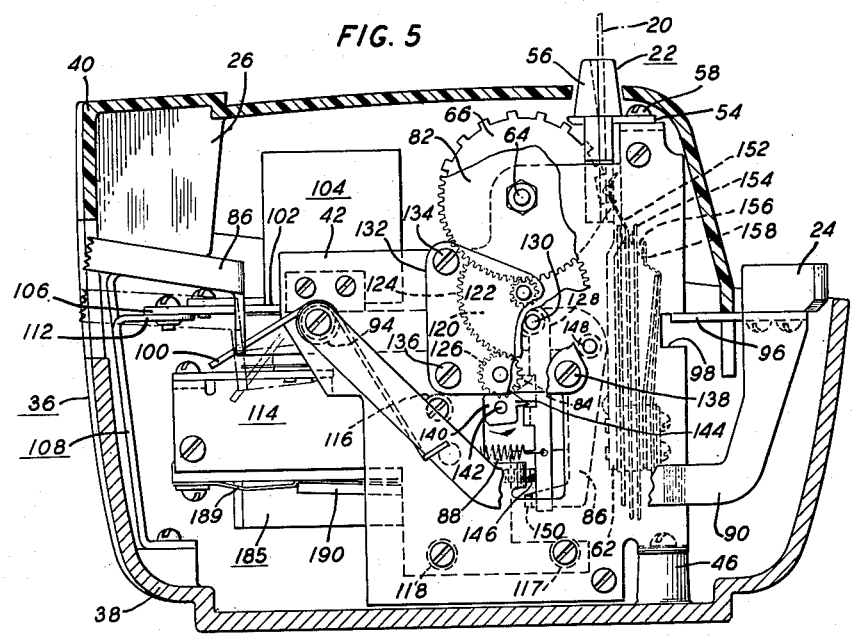
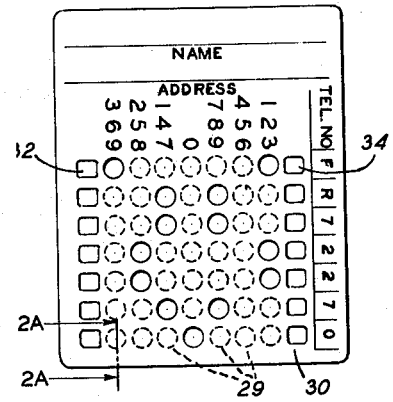
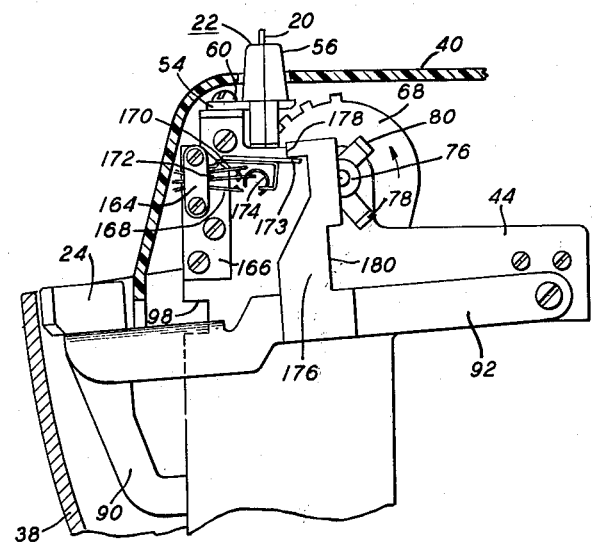
INVENTORS
E. R. ANDREGG
W. PFERD
R. R. STOKES
BY
ATTORNEY

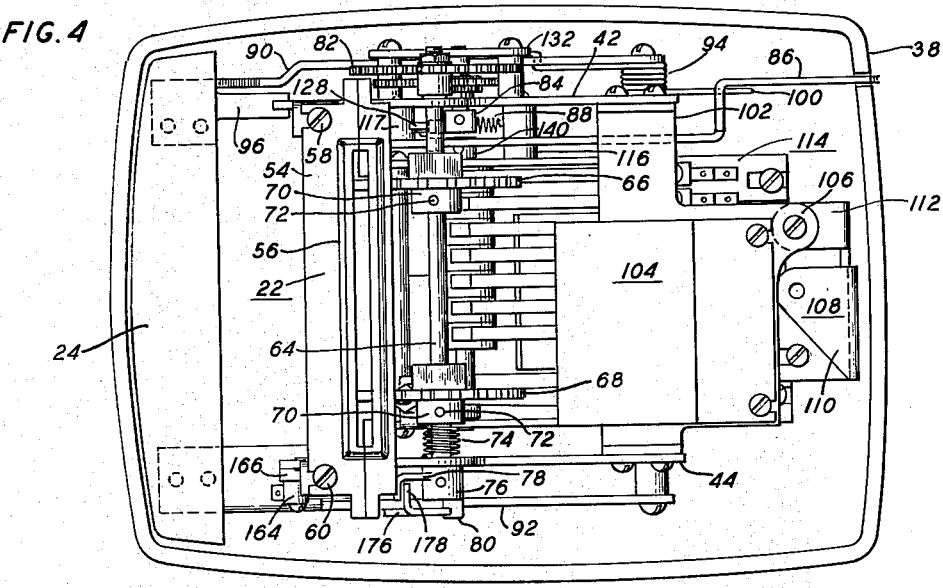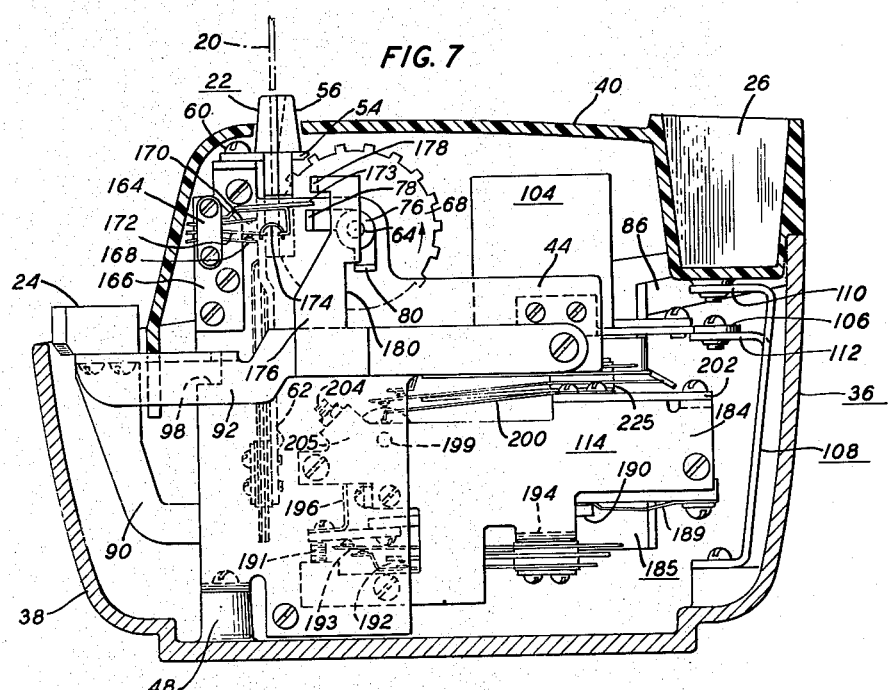

March 10, 1964 E. R. ANDREGG ET AL 3,124,659
CARD DIALER
Filed Oct. 2, 1959 11 Sheets-Sheet 5
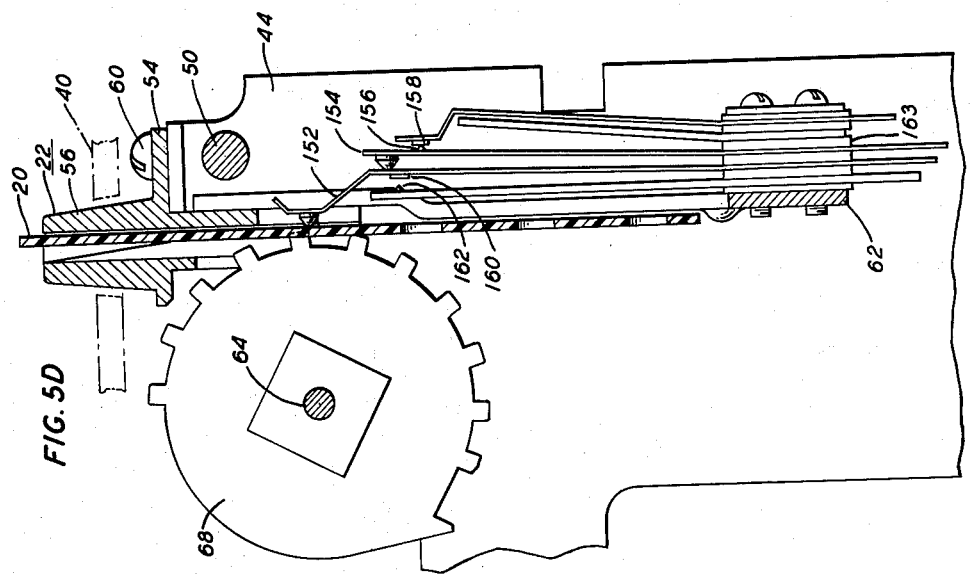
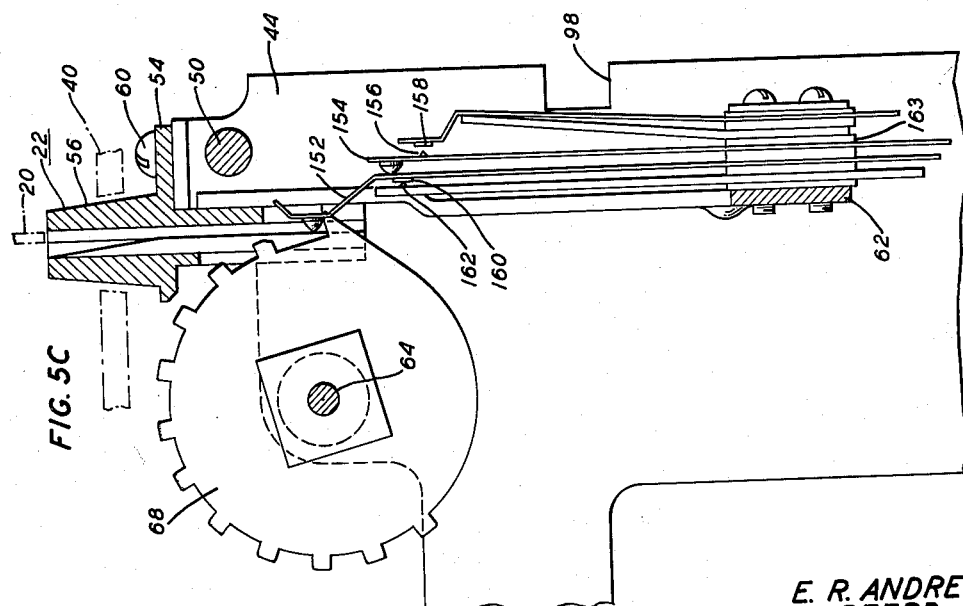
INVENTORS  E. R. ANDREGG
W. PFERD
R. R. STOKES
BY
ATTORNEY

INVENTORS
E. R. ANDREGG
W. PFERD
R. R. STOKES

BY Joseph C. Redmond Jr.
ATTORNEY

March 10, 1964 E. R. ANDREGG ET AL 3,124,659
CARD DIALER
Filed Oct. 2, 1959 11 Sheets-Sheet 7

INVENTORS E. R. ANDREGG
W. PFERD
R. R. STOKES
BY
ATTORNEY

March 10, 1964   E. R. ANDREGG ET AL   3,124,659
CARD DIALER
Filed Oct. 2, 1959   11 Sheets-Sheet 10

INVENTORS  E. R. ANDREGG
W. PFERD
R. R. STOKES
BY
ATTORNEY

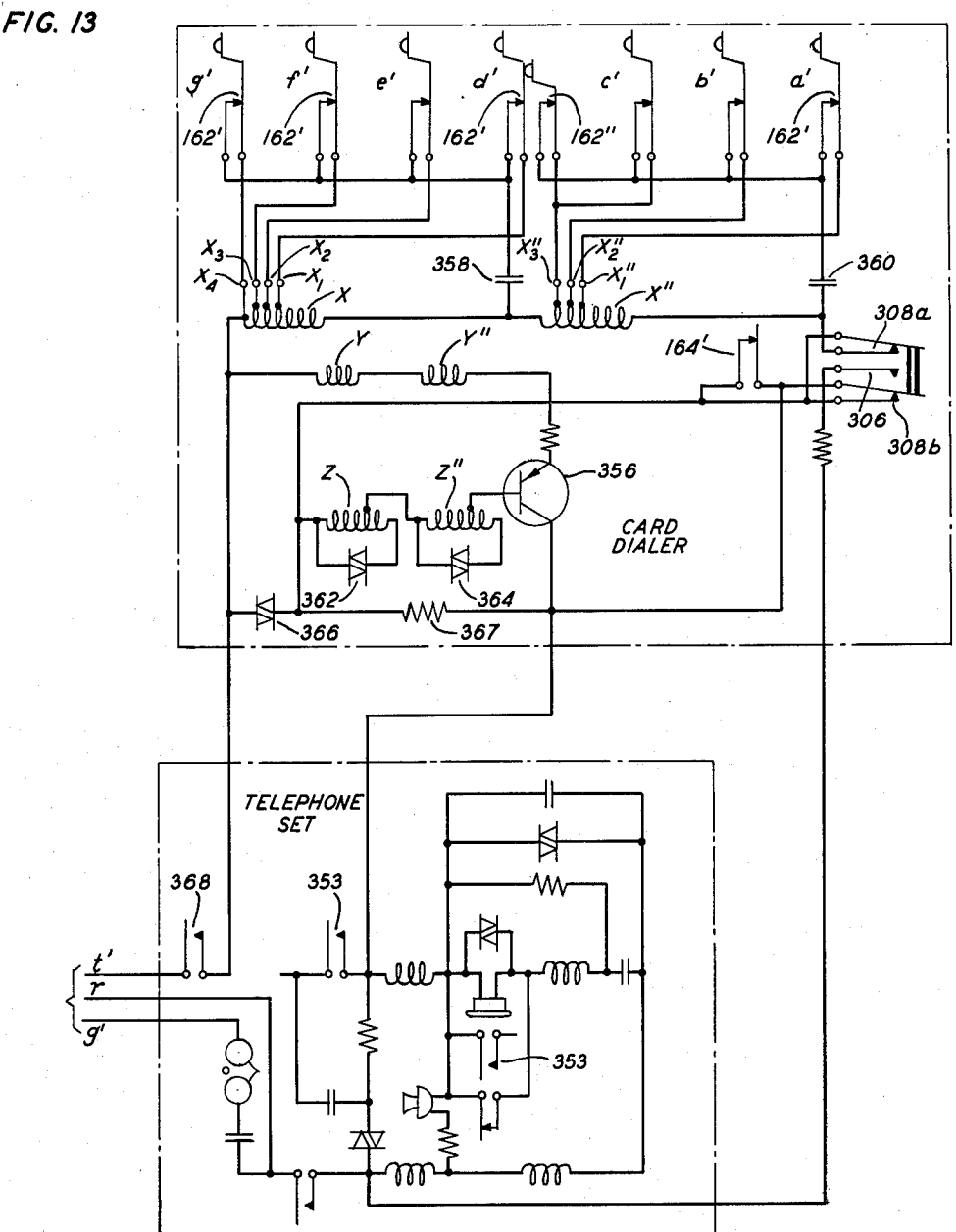

3,124,659
CARD DIALER
Ernest R. Andregg, Newark, William Pferd, Watchung, and Rembert R. Stokes, Springfield, N.J., assignors to Bell Telephone Laboratories, Incorporated, New York, N.Y., a corporation of New York
Filed Oct. 2, 1959, Ser. No. 844,054
8 Claims. (Cl. 179—90)

This invention relates to call transmitters and particularly to automatic call transmitters employing a code bearing medium having a plurality of digits designating a subscriber to a communication system encoded thereon.

The installation of ten digit or nation wide dialing by many telephone companies should create an increased demand on the part of telephone subscribers for automatic dialing means due to the complexity of dialing ten digit subscriber numbers and the attendant accuracy required in the dialing process. To enhance subscriber appeal, automatic dialers should be compact, easily operable, and have relatively low installation and service charges. From a company standpoint, automatic dialers should be reliable, easily serviced and have low maintenance cost. Especially important from a company's standpoint, automatic dialers should be operable under present day or D.C. pulsing systems and readily convertible to prospective pulsing systems for electronic switching systems, for example, the multi-frequency or A.C. pulsing system described in the patent application of L. A. Meacham and L. Schenker, Serial No. 743,434, filed June 20, 1958, and issued on January 29, 1963, as Patent 3,076,059, which is assigned to the same assignee as that of the present invention.

An object of the present invention is an improved automatic call transmitter which is compact, easily operable and installed at a subscriber's station.

Another object of the present invention is an automatic call transmitter which is convertible from D.C. to A.C. pulsing or vice versa.

Still another object of the present invention is an automatic call transmitter which is rapid and accurate in operation.

A specific object of the present invention is to provide an automatic call transmitter which is operated solely on power received from a communication line.

In an illustrative embodiment, the automatic call transmitter includes a card reading device employed in conjunction with a telephone set, the card reading device including means for transporting an encoded card past sensing members included in a switching means. The card transport means is mechanically driven and actuated by a suitable linkage. Associated with the card transport means is means for controlling advancement of the card past the sensing members. A signal generator controlled by the switching means is adapted to transmit signals over a telephone circuit in accordance with the coding on the card.

These and other features of the present invention will be more fully apprehended from the following detailed specification taken in conjunction with the appended drawing in which:

FIG. 2 is one embodiment of an encoded card that may be employed in the operation of the call transmitter shown in FIG. 1;

FIG. 2A is a view of FIG. 2 along the line 2—2′;

FIG. 4 is a plan view of FIG. 1 with the cover thereof removed;

FIG. 5 is a left elevational view of FIG. 1, the housing and cover thereof being broken away;

FIG. 5C is a fragmentary section of FIG. 3 along the line 5C—5C′ showing the card transport mechanism and sensing contacts prior to the insertion of an encoded card into the call transmitter of FIG. 1 for dialing purposes;

FIG. 5D shows the operation of the card transport mechanism and sensing contacts of FIG. 5C after an encoded card is inserted into the card slot of the call transmitter of FIG. 1;

FIG. 7 is a right elevational view of FIG. 1, the cover and housing thereof being broken away;

FIG. 8 is a fragmentary view of FIG. 7 showing the push bar mechanism in the operated condition after an encoded card is inserted into the card slot;

FIG. 13 is a schematic electric circuit of the call transmitter and a telephone set adapted for multi-frequency or A.C. pulsing.

*General Description*

Figure 1:
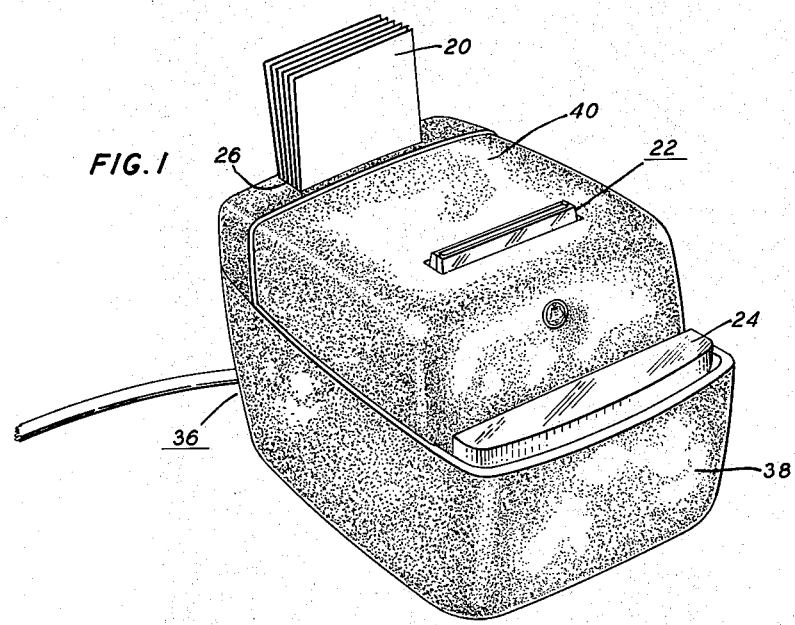
FIG. 1 is a perspective view of one embodiment of the automatic call transmitter of the present invention showing a push bar, card slot and card storage bin of the device.

A call transmitter in accordance with the present invention shown in FIG. 1 and hereinafter referred to as a card dialer is designed to supplement the dialing facilities of a telephone set (not shown) in providing automatic means for dialing a desired number. The card dialer, as will be described in more detail hereinafter, can be employed with a telephone set for either D.C. or A.C. pulsing provided certain minor changes are made to the dialer. When not in use the card dialer does not affect the dialing or transmission characteristics of the telephone set.

To operate the dialer, the subscriber selects an encoded card 20 from a storage bin 26 included in the dialer and removes the handset of the telephone set (not shown). Next, the encoded card 20 is inserted into a card slot 22 included in the dialer, the encoded card having been previously punched with the desired 7 digit or 10 digit telephone number by the subscriber. Thereafter, the subscriber urges the card into the slot 22 until the card is fully inserted into the dialer. Next, the subscriber depresses suitable means, such as a push bar mechanism 24, to activate a card transport mechanism (see FIG. 10) which drives the card out of the dialer. As the card is driven out of the slot, the desired telephone number encoded in the card is dialed automatically by the dialer, the dialing being rapid and accurate and thereby facilitating telephone service for the subscriber. After completion of the dialing, the dialer is automatically disconnected from the telephone circuit and the subscriber can converse with the called party. The encoded card may be restored to the storage bin 26 or it may be stored in more permanent storage means such as a folder.

Also included in the dialer, as will be described hereinafter, are means for releasing the card before or during the process of dialing, said means preventing the dialing of an erroneous number if the subscriber has selected the wrong encoded card.

Broadly, the dialer comprises a card transport mechanism, a switching means including card sensing means, and a signal generator. The previously mentioned apparatus will be described first for the D.C. dialer and then for the A.C. dialer. Before a detailed description is given of either dialer, however, the encoded card, which is suitable for use in either dialer, will be described in detail.

The card 20 for operating either the A.C. or D.C. dialer is shown in detail in FIG. 2. It should be understood that the card 20 is only one of several embodiments that may be employed in the invention, the embodiment shown herein being selected solely for reasons of convenience in explanation. The card is composed of an insulating member 28, typically plastic, having a plurality of punched holes 29 therein in row and columnar fashion, the member 28, as shown in FIG. 2A, being covered by a paper member 30 to form punchable holes therein which are easily punched by a pencil or similar instrument. At the top of the card, space is provided for the name and address of the person to be called. Along one side of the card, space is provided for indicating the telephone number of the person desired to be called. Each digit or letter of the telephone number is located in one of the rows of punchable holes. Above each column of punchable holes are three digits, any one of which may be encoded in that row. It should be noted that each number in a column also appears in another column with two other digits. The digit "0," however, appears in the fourth column only.

The number of rows of punchable holes corresponds to the number of digits and letters included in the telephone number of the subscriber desired to be called. As shown, the desired telephone number has two letters and five digits and the card has seven rows of punchable holes. The card, however, may be employed with ten digit telephone numbers by increasing the number of rows from seven, as shown, to ten rows of punchable holes. The number of columns of punchable holes on a card, however, is the same for all telephone numbers since each number is based on the same radix.

Figure 5A:
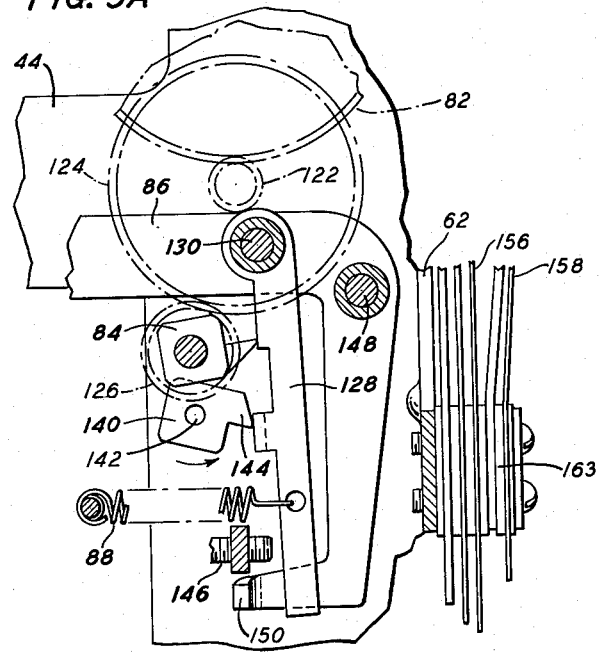
FIG. 5A is a fragmentary section of FIG. 3 along the line 5A—5A′ showing a pawl mechanism for controlling the movement of a card transport mechanism disclosed in FIGS. 4 and 5.

To encode the card with the telephone number listed at the side thereof, each digit or letter of the number is encoded in the row in which the digit or letter is located. The subscriber encodes the number or letter listed at the end of a row by punching two holes in the row for the digits 1 through 9 or one hole in the row for the digit "0." The holes, of course, should be located in columns which include the number or letter to be coded. In the case of letters, it should be noted that each is converted into a digit, the conversion being the same as that shown on a conventional telephone dial. It is believed evident at this point that each number or letter will be represented uniquely by a different combination of two columns except the number "0" which is encoded in the fourth column only. Thus, for the telephone number FR 7–2270 the card is punched twice on each row as indicated by the solid circles except for the number "0" which is punched once on the last row. The card is now ready to be inserted into the dialer. On each side of the punchable holes are a series of rectangularly shaped sprocket holes 32 and 34 which engage the card transport mechanism (see FIG. 5D) to enable the card to be carried into and out of the dialer. It should be noted that the sprocket holes 32 and 34 are spaced differently from the sides of the card. The spacing of the sprocket holes codes the card so that it may be inserted into the card dialer in one manner only thereby insuring the proper dialing of the encoded telephone number.

*Structural Details*

Figure 3:
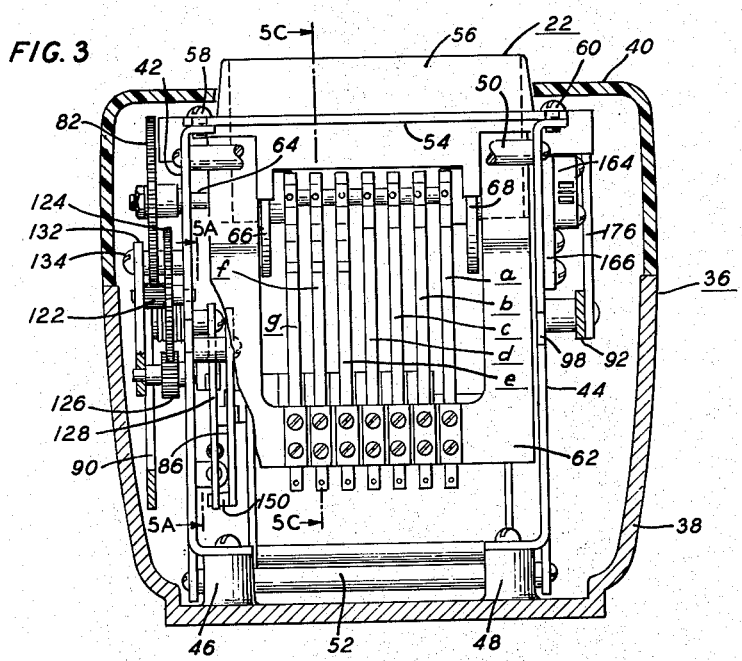
FIG. 3 is a front elevation of FIG. 1, the housing and cover thereof being broken away beyond the push bar.

Turning now to FIG. 3, the dialer shown therein is for D.C. pulsing systems and comprises a housing 36 including a metallic base 38 and a plastic cover 40. The dialing mechanism is supported within the housing on side plate members 42 and 44 which are secured to pedestals 46 and 48 by means of suitable fasteners threaded into tapped holes included in the pedestals. The side plate members 42 and 44 are connected together by means of tie rods 50 and 52, the side plate members and tie rods forming a rigid and sturdy frame for mounting the various mechanical and electrical elements of the dialer.

Secured to the top of the side plate members and extending therebetween is the card slot 22 which receives the encoded card employed in the dialing process. The card slot extends above the plastic cover 40 as shown in FIGS. 1 and 3, and is formed of two sections riveted together to form a guideway therebetween. Each section comprises a base portion 54 and a channel portion 56, the base portion including holes therein to accommodate fasteners 58 and 60 which thread into tapped holes included in the side plate members 42 and 44.

Anchored to the lower portion and in front of the card slot assembly 22 (as seen in FIG. 3) is a U-shaped mounting plate 62 for holding a plurality of sensing contacts *a* through *g* which will be described in more detail hereinafter.

Additional structural details of the dialer will be seen by referring to FIG. 4. Attached to the side plates 42 and 44 by means of members 90 and 92, respectively, is the push bar 24. The members are suitably shaped (see FIGS. 5 and 7) to avoid contact with the other elements of the dialer. A spring 94 biases the push bar into an upward position, the movement of the push bar being limited by means of a tab 96 that is secured to the base of the push bar and extends into a notch 98 (see FIG. 5) included in the side plate member 42. The spring 94 in addition to biasing the push bar 24 also includes a tail portion 100 which biases a releasing bar 86.

Figure 9:
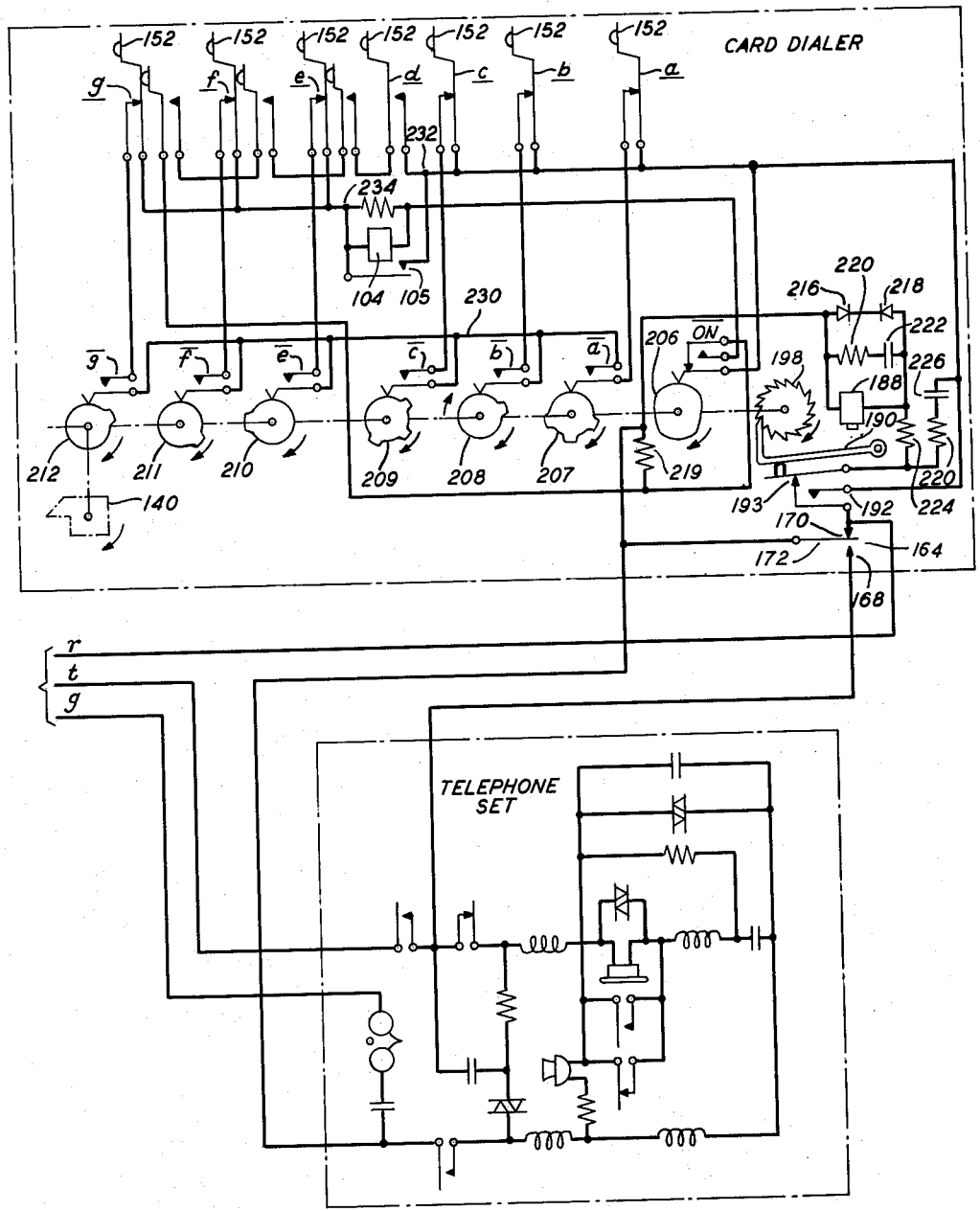
FIG. 9 is a schematic electric circuit of the call transmitter and a telephone set adapted for automatic D.C. pulsing.

Also shown in FIG. 4 is a bedplate 102 mounted between the side plate members 42 and 44 by suitable fasteners. The bedplate has attached thereto a control relay 104 which is of commercial manufacture and will be described in conjunction with the electrical circuit of the dialer which is shown in FIG. 9. The bedplate includes an eyelet portion 106 which engages a stand 108 secured to the rear of the metal base 38. The stand has curved finger members 110 and 112, the former for receiving a fastener to hold the cover 40 (see FIG. 7) securely against the base and the latter for receiving a fastener which extends through the eyelet 106 of the bedplate to prevent the frame from rotating about the pedestals 46 and 48 (see FIG. 3).

Figure 6:
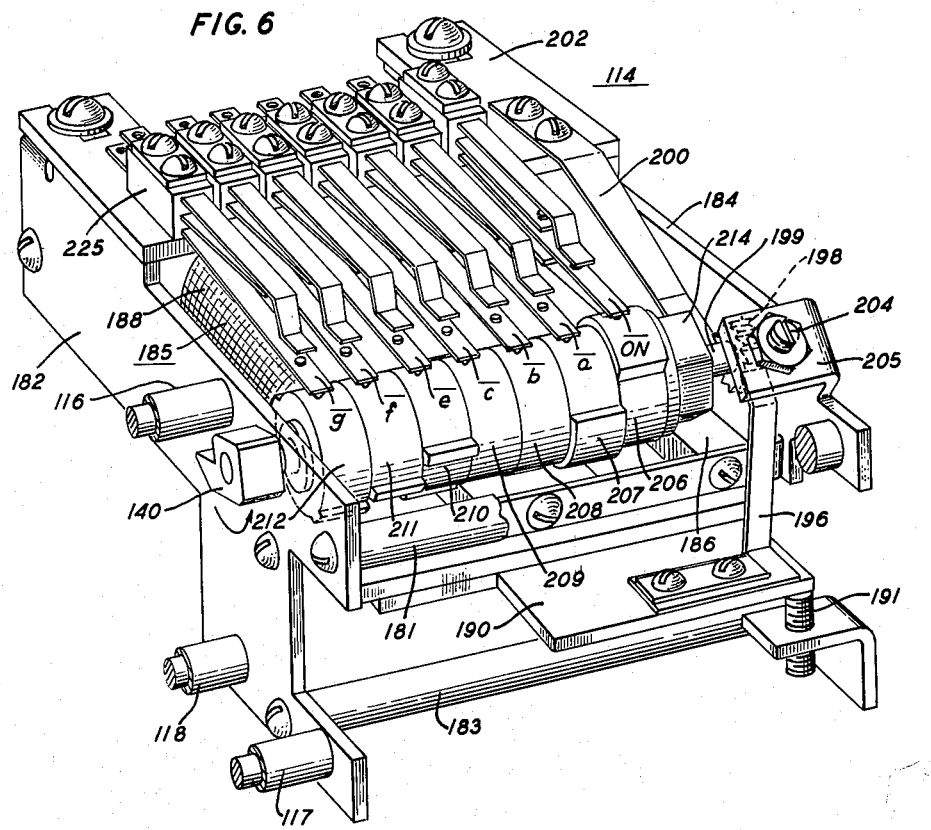
FIG. 6 is a perspective view of a pulsing device included in the call transmitter shown in FIG. 1.

Positioned beneath the bedplate and the control relay is a pulser assembly 114 which is secured to the side plate member 42 by supporting bars 116, 117 and 118, the latter bar not appearing in FIG. 4, but being shown in FIG. 6. The pulser assembly will be described in more detail in connection with FIG. 6.

Card Transport Mechanism

The mechanism for transporting the encoded card through the sensing contact assembly is best described by considering FIGS. 4, 5, 5A and 5B. In FIG. 4 the card transport mechanism comprises a shaft 64 journaled in the side plate members 42 and 44. Mounted on the shaft 64 and between the side plate members are toothed wheels 66 and 68, each including a hub portion 70 and a set screw 72 for securing the wheel to the shaft. A helical spring 74 is coiled about the shaft 64, the spring being connected at one end to the plate member 44 and at the other end to the toothed wheel 68. The shaft 64 also includes a hub member 76 having bent arm members 78 and 80, the function of which will be described hereinafter.

At the shaft end opposite the hub member 76 is a drive gear 82 which is part of a reduction gear assembly for driving a pawl 84, the reduction gear assembly and pawl being driven when the spring 74 unwinds. A notched bar or escapement latch 128 biased by a spring 88 engages the pawl and normally holds the pawl and reduction gear assembly against rotation by the spring 74. The releasing bar 86 is adapted to remove the latch from the pawl 84 to permit rotation thereof when the spring 74 is loaded.

Turning now to FIGS. 3 and 5, the reduction gear assembly will be described, the assembly being previously mentioned in connection with the description of FIG. 4. The drive gear 82 mounted on the end of the shaft 64 engages an idler gear 120 having a pinion section 122 and a drive section 124, the latter section engaging a pinion gear 126, the shaft of which includes the pawl 84 shown behind the pinion 126. The pawl engages the latch 128 journaled on a pin 130 secured to side plate 42 on which plate 132 covering the reduction gear assembly is mounted. The plate is spaced from the reduction gear assembly by bolts 134, 136 and 138 which thread into tapped holes (not shown) included in the side plate 42. The latch 128 is biased against the pawl 84 by the helical spring 88, the biasing action of the bar preventing movement of the reduction gear in one direction. Since the reduction gear assembly is connected to the shaft 64, the holding action of the latch against the pawl also prevents rotation of the shaft 64 and the toothed wheels 66 and 68.

The card transport mechanism is loaded for operation by inserting the encoded card into the card slot. As the card is depressed into the housing, the toothed wheels 66 and 68 are engaged by the rectangularly shaped sprocket holes 32 and 34 in a rack and gear arrangement to rotate the wheels in a clockwise direction when viewed from FIG. 5. The card in acting as a rack ensures positive loading of the card transport mechanism. During the insertion of the card into the dialer, the spring 74 for driving the card transport mechanism is loaded and the pawl 84 engages the latch to prevent the card transport mechanism from operating. It should be noted that the latch means prevent release of the card whether one row or the last row of the card is inserted into the dialer.

The card transport mechanism is designed to stop entry of the card into the dialer after the last hole thereof enters the dialer. When the toothed wheels engage that portion of the card without sprocket holes therein, the card is wedged against the card slot to prevent further entry into the dialer. Thus, the length of the card is of no consequence to the card transport mechanism since the card may only be inserted for the number of code rows included in the card. The maximum number of rows that may be included in a card is limited by the distance between the bottom of the housing and the follower of the sensing contact. The number of teeth on the wheels must be at least equal to the number of code rows included in the card.

An escapement cam 140, suitably journaled on a shaft 142 driven by the pulser assembly 114, is adapted to free the pawl from the latch 128. The action of the escapement will be better appreciated by considering FIG. 5A wherein it is seen that as the escapement cam 140 rotates a raised portion 144 engages a section of the latch 128 which urges the latch away from the pawl. As the portion 144 rotates away from the latch, the spring 88 returns the latch to a position abutting a stop 146. When the latch is removed, the pawl is free to rotate until the return of the latch to the position abutting the stop 146, the card 20 being advanced out of the dialer in a step by step fashion each time the pawl rotates.

Figure 5B:
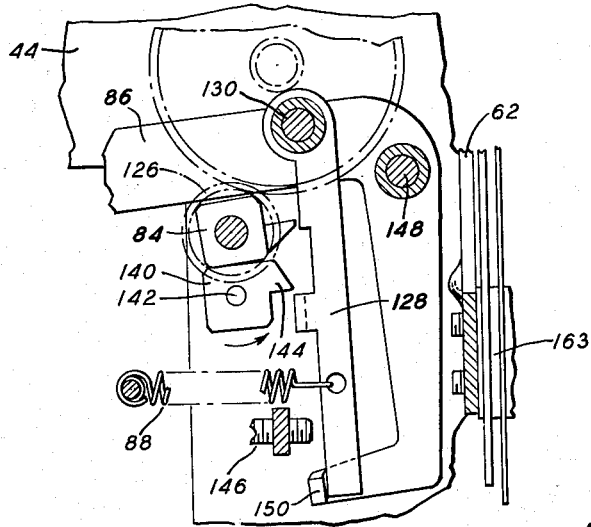
FIG. 5B shows the operation of a releasing bar mechanism in FIG. 5A for releasing an encoded card before or during the process of dialing.

The latch may also be removed from the pawl by means of the releasing arm 86. As shown in FIG. 5B, the arm 86, which is journaled on a pin 148, includes a bent arm section 150 which curves behind the latch 128. When the releasing bar is depressed, it will be seen that rotation thereof occurs about the pin 148 and the bent arm portion 150 pulls the latch away from the pawl 84 allowing rotation thereof to occur until the latch is returned to the normal position. The releasing bar permits an encoded card to be withdrawn from the dialer before or during the process of dialing.

Sensing Contacts

Returning to FIG. 5, the sensing contact assembly shown therein will next be described. The contact assembly is included in the switching means of the dialer, said means controlling a signal generator to convert the telephone number encoded in the card into corresponding electrical signals. As previously mentioned, the contact assembly includes seven separate contacts, each contact having a follower member 152 which rides on the card. The adjacent contacts $d$ through $g$ (see FIG. 3) include a transfer member 154 having a contact 156 thereon which engages a spring-loaded break contact 158. The follower 152 of adjacent contacts $e$ through $g$ also includes a contact 160 which engages a spring loaded make contact 162, this contact being excluded from contact $d$. The remaining contacts $a$ through $c$ have only the follower 152 and the make contact 162, the transfer member 154 and break contact 158 being excluded therefrom. Each section of the sensing contact assembly is mounted in an insulating block 163 secured to the mounting plate 62 by suitable fasteners.

The make and break action of the sensing contact assembly is shown in FIGS. 5C and 5D. FIG. 5C shows the normal position of a make and break contact assembly before the insertion of an encoded card into the card slot 22. In this position, the make contact 162 is closed and the break contact 158 is open. When the encoded card 20 is inserted into the card slot 22, the follower rides up on the card and in so doing opens the make contact 162 and closes the break contact 158. As the card is driven out of the card slot by the card transport mechanism, the followers will drop into the punched holes in a row representing a number encoded in the card. In the case of the contacts $a$ through $c$ when a follower enters a punched hole, the make contact 162 associated therewith will be closed. In the case of the contacts $e$ through $g$ when a follower thereof enters a punched hole the make contact 162 and the break contact 158 associated therewith will close and open, respectively. In the case of the sensing contact $d$ only the break contact 158 will open. Thus, it will be seen that the sensing contacts will be operated in accordance with the punched holes engaged by the respective followers during the passage of the card out of the dialer.

The Pulser Assembly or Signal Generator

Figure 6A:
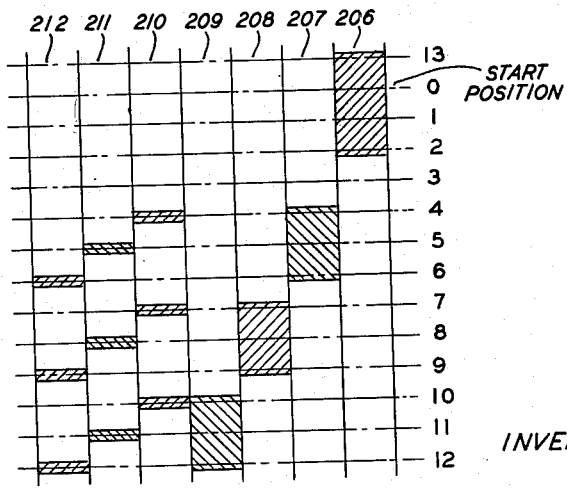
FIG. 6A is a plot of cam positions and raised flats (shadowed) of the cams included in the pulser of FIG. 6.

The pulser assembly or signal generator included in the translation means is shown in more detail in FIGS. 6 and 6A. The pulser comprises side plates 182 and 184 which are connected together by tie rods 181 and 183 and a mounting plate 202. As previously mentioned, the pulser assembly is secured to side plate 42 (see FIG. 4)

by supporting bars 116 through 118. Mounted between the side plates 182 and 184 is an electromagnet 185 including a three-legged magnetic core 186, only the ends of which are shown, and a magnetic coil 188. An armature 190, suitably hinged to the core and spring loaded (see FIG. 7) is operated when the coil 188 is energized. The armature also includes a leaf spring 196 which engages a ratchet wheel 198 mounted on a shaft 199 journaled in the side plates 182 and 184 of the pulser. In the normal position, as shown in FIG. 7, the armature rests on a stop 191 and opens a make contact 192 and closes break contact 193 (see FIG. 7) suitably secured to a plate 194 mounted between the side plates 42 and 44. As shown in FIG. 6, the pulser assembly also includes a detent spring 200 secured to the plate 202, the function of which is to limit the movement of the ratchet wheel 198. To prevent the ratchet wheel from being overdriven by the leaf spring 196, a positive stop 204 is threaded into a tab section 205 of the side plate member 184. The detent spring and the leaf spring cooperate to limit the movement of the ratchet wheel and the shaft 199 to a single step when the armature 190 is raised on energization of the coil 188 included in the electromagnet. The detent spring and the leaf spring also prevent backward rotation of the ratchet wheel when the armature returns by gravity and the force of an armature spring 189 to the normal position which is in contact with the stop 204.

Also mounted on the shaft 199 is the escapement cam 140, (previously described in connection with FIGS. 5A and 5B), and cams 206 through 212. Each cam has a unique configuration as shown in FIG. 6A. The cams are held in juxtaposed relation by a pin (not shown) which extends through holes in the cams held in place by a nut 214 threaded on the shaft.

Cooperating with the cam assembly are cam-operated contacts $\overline{a}$, $\overline{b}$, $\overline{c}$, $\overline{d}$, $\overline{e}$, $\overline{f}$, $\overline{g}$ and $\overline{on}$, each contact being a make contact except for the $\overline{on}$ contact which includes a make and break section. The cam-operated contacts are supported at corresponding ends in a seven section insulator block 225 secured to the plate 202 by suitable fasteners. As will be described hereinafter, the contacts $\overline{a}$, $\overline{b}$, $\overline{c}$, $\overline{d}$, $\overline{e}$, $\overline{f}$, $\overline{g}$ and $\overline{on}$ are caused to close in unique configurations as the cams 206 through 212 are driven by rotation of the shaft 199.

The operation of the pulser will now be described. When the electromagnet 185 is energized, the armature 190 is raised and advances the ratchet wheel 198 by the action of the leaf spring 196. The detent 200 and the positive stop 204 limit the advance of the ratchet wheel to a single tooth position each time the electromagnet is operated. When the electromagnet is deenergized, the armature falls by gravity and the return spring 189 until it engages the stop 191, the detent 200 preventing the ratchet wheel from rotating backward as the leaf spring slides off of the wheel. As will be pointed out hereinafter, the electromagnet is connected and disconnected from a source of direct current at a fixed frequency, the ratchet wheel being advanced a discrete step each time the electromagnet is energized. For satisfactory operation of a dialer, it has been found that at least fourteen teeth are required on the ratchet wheel.

As the ratchet wheel advances from one discrete position to the next, the raised flats of the various cams are brought into engagement with the corresponding cam-operated contacts to cause operation thereof. The diagram in FIG. 6A indicates the fourteen discrete positions of the cams 206 through 212, the shaded portions of FIG. 6A indicating when a raised portion of a cam engages a cam-operated contact to cause operation thereof. For example, cam 212 engages the $\overline{g}$ contact at the 6th, 9th and 12th positions of the shaft to cause closure thereof. Similarly, cam 211 engages the $\overline{f}$ contact at the 5th, 8th and 11th positions of the shaft to cause closure thereof.

It will be seen also from FIG. 6A that from the 4th position through the 12th position of the cam assembly at least two contacts are closed whereas from the 13th, 0th, 1st and 2nd positions only the contact $\overline{on}$ is operated. During the interval when two contacts are closed, each position of the cam assembly corresponds to one of the numbers from "0" to "9." The interval where one contact is closed is known as the interdigital period during which the encoded card is advanced from one row to the next in the sensing contacts. The cam positions in the interdigital period are not representative of any number. During the 3rd position of the shaft none of the contacts $\overline{a}$ through $\overline{g}$ is closed.

The pulser assembly is connected electrically to the sensing contacts $a$ through $g$ (see FIG. 2) to form a switching means for controlling a signal generator to convert the telephone number encoded in the card into corresponding electrical signals representative of the telephone number. The electrical connections of the switching means and the operation thereof will be described more fully hereinafter.

The pulser assembly 114 is shown in FIG. 7 installed in the housing of the dialer. Also included in FIG. 7 is a start switch 164 for connecting the pulser to a telephone circuit (not shown). The start switch is secured to a plate 166 attached to the side plate 44, the switch including fixed contacts 168 and 170 and a transfer member 172 which is actuated by a movable arm 173 secured to the mounting plate 166 and connected to the transfer member 172 by a bowed spring 174. The start switch 164 shown in the normal position is actuated by the push bar 24, the side member 92 thereof having attached thereto a riser 176 which includes a hammer portion 178 for engaging the movable arm 173. When the push bar is depressed (as shown in FIG. 8), the hammer portion 178 is lowered and engages the movable arm which in turn transmits a slight upward movement to the transfer member 172 through the bowed spring 174. The slight movement of the bowed spring is sufficient to cause the transfer member to shift from fixed contact 168 to fixed contact 170. The transfer member will retain this position after the release of the push bar due to the stiffness of the member. The push bar 24 on release thereof returns to the normal position as a result of the biasing action of the spring 94 (see FIG. 5).

The riser 176 also includes a notched section 180 which engages the bent arm 80 of the hub 76 as shown in FIG. 7. The hub is secured to the shaft 64 of the card transport mechanism. In this position or the normal position the card transport mechanism is prevented from rotating in a clockwise direction. The teeth on the wheels 66 and 68 prevent the mechanism from rotating counterclockwise beyond the normal position. Also, the push bar 24 is unable to move because the bent arm 80 acts as a stop to the riser 176. As shown in FIG. 8, when the card 20 is inserted into the card slot 22, the card transport mechanism is loaded, the shaft 64 and the bent arm 80 being rotated counterclockwise. In loading the card transport mechanism the bent arm is removed from the riser 176 thereby freeing the push bar 24 for operation.

The bent arm 78 is for the purpose of resetting the start switch 164. In returning to the normal position after the card 20 is driven out of the card slot 22, the card transport mechanism rotates the bent arm 78 until it engages the arm 173. The arm 78 applies an upward movement to the arm 173 which in turn transmits a downward movement to the transfer member 172 through the bowed spring 174, the transfer member 172 returning to the normal position engaging the fixed contact 168.

*Electrical Circuit*

In FIG. 9 the circuit diagram of the D.C. dialer comprises a telephone substation circuit and a card dialer circuit, each circuit being blocked out in dot and dash lines. A telephone circuit including tip (*t*), ring (*r*) and ground (*g*) lines is connected to the telephone substation circuit and the card dialer circuit, the ring line being connected directly to the dialer and the tip and ground lines being connected to the dialer through the telephone set. The telephone set may be any conventional instrument as, for example, that disclosed in United States Patent 2,629,-783 to H. F. Hopkins, issued February 24, 1953. In describing FIG. 9 the same reference designations will be employed for circuit elements which have been previously described in connection with the mechanical description of the dialer.

The ring line is connected to the dialer through the start switch 164 which in the normal position, as shown, short circuits the dialer from the telephone line. In the operated position of the start switch, the pulser coil 188 is connected in series with the ring line through the break contact 193 of the pulser and a current limiting resistor 224. The coil 188 is paralleled by a pair of diodes 216 and 218, the former regulating the voltage across the coil and the latter providing a high impedance to prevent a reverse current from flowing through the diodes 216 and 218 which would affect the release time of the pulser. The coil 188 is also paralleled by a time constant circuit including a resistor 220 and a capacitor 222, the time constant circuit controlling the release time of the pulser. For additional control of the pulser release time, a resistor-diode combination (not shown) may be connected across the coil 188. Regulation of the coil in the manner described insures the proper operation of the pulser contact 193 so that pulses produced on operation thereof are identical to those that would be developed by a conventional mechanical dial.

When the pulser coil is connected to the line, the armature 190 raises and opens the pulser break contact 193 in the ring line. The interruption in the ring line releases the armature and creates the appearance of a pulse by the absence of current in the line. The pulser coil repeats this process so long as the start switch 164 is operated. The pulses on the ring line, however, are limited in quantity by a switching matrix which will be described hereinafter.

When the pulser coil operates the break contacts 193, it also closes the pulser make contacts 192 which connect one side of the switching matrix to the ring line ahead of the pulser contact 193, the other side of the matrix being connected through a current limiting resistor 219 to the ring line beyond the pulser contact 193. Connected between the contacts 192 and 193 is a resistor 223 in series with a capacitor 226, the RC circuit being for contact protection purposes.

The switching matrix is adapted to permit the ring line to be pulsed until the number of pulses corresponds to the number sensed by the sensing contacts *a* through *g*. Thereafter, the pulses on the ring line are obliterated by the matrix which forms a low resistance current path to bypass the pulser contact 193. The matrix switching network comprises the sensing contacts *a* through *g*, cam-operated contacts $\bar{a}, \bar{b}, \bar{c}, \bar{e}, \bar{f}, \bar{g}, \overline{on}$ and the control relay 104. The sensing contacts are shown in the normal condition where an encoded card has not yet been inserted into the dialer. In the matrix, corresponding sensing and cam-operated contacts are connected in series, the series connected contacts $a\bar{a}, b\bar{b}$ and $c\bar{c}$ each forming a branch of a first parallel network and the series connected contacts $e\bar{e}, f\bar{f}$ and $g\bar{g}$ each forming a branch of a second parallel network. A bus bar 230 connects the parallel networks in series with each other to form the matrix, the ends of which are at points 232 and 234. The relay 104 includes contacts 105 which are connected across the matrix or to the matrix end points 232 and 234. One side of the matrix or the end point 232 is connected through three different paths to the ring line ahead of the pulser contact 193. The first path is directly through the pulser make contacts 192. The second path is through break section of the $\overline{on}$ contacts, the resistor 219, and the start switch 164. The third path is through the break section 158 of the sensing contacts *d, e, f* and *g*, the resistor 219 and the start switch 164.

The other side of the matrix or the end point 234 is connected through a single path to the ring line beyond the pulser contact 193. The single path is from the end point 234 through relay 104 to the make section of the $\overline{on}$ contact thence through the resistor 219 and the contact 170 of the start switch 164.

A current path around the pulser contacts 193 is completed when the break sections of the sensing contacts *d, e, f* and *g* are all closed or when a branch of each parallel network included in the matrix is closed. For example, operation of the contacts $a\bar{a}$ and $e\bar{e}$ completes a path about the pulser contact 193 when the make section of the $\overline{on}$ contact is closed. When either of the previously mentioned current paths is completed, operation of the pulser contact 193 does not interrupt the current flow on the ring line to thereby produce the appearance of a pulse on the line. Or stated another way, the previously described current paths around the pulser contacts 193 obliterate the pulsing action thereof.

On completion of a current path through the parallel networks included in the matrix, the ring current is supplied to the control relay 104 which operates, the contacts thereof closing to form a short circuit between the switching matrix end points 232 and 234. The control relay is a slow release relay and once operated it remains locked up until the pulser cam 206 returns to the 13$^{th}$ position (see FIG. 6A).

D.C. Dialer Operation

Figure 10:
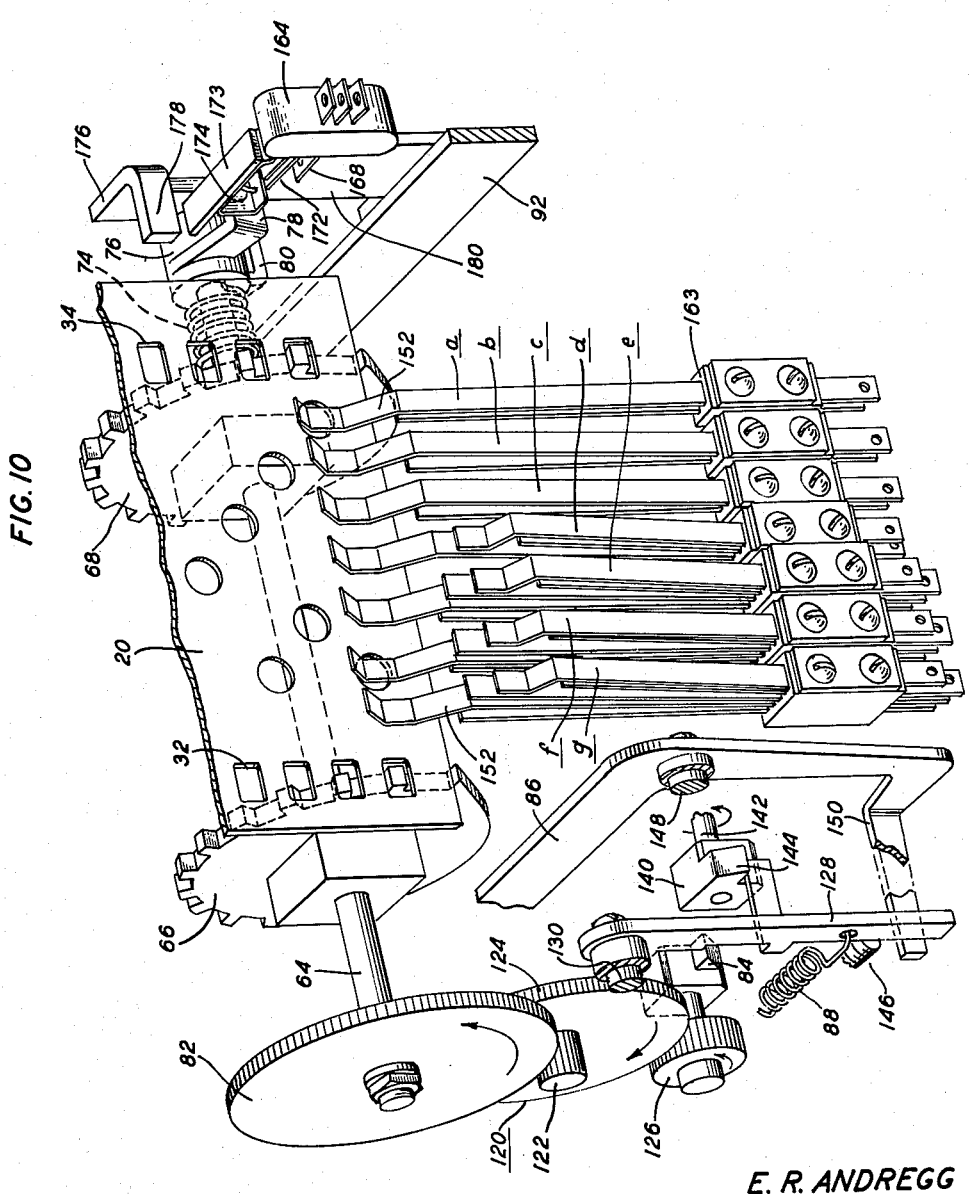
FIG. 10 is an exploded view for purposes of illustrating the cooperation of the card transport mechanism, the sensing contacts and the escapement mechanism of the call transmitter adapted for D.C. pulsing.

The operation of the D.C. dialer will be described in conjunction with FIGS. 6A, 9 and 10, the latter showing an exploded view of the sensing contact assembly, card transport mechanism and start switch assembly. The subscriber begins the operation of the dialer by removing the handset from the telephone instrument (not shown) and selecting the encoded card of the desired telephone number which, for purposes of the present invention, is the card shown in FIG. 2. Next, the card is inserted into the card slot (see FIG. 1) of the dialer where the sprocket holes 32 and 34 engage the teeth of the wheels 66 and 68 of the card transport mechanism. As the card is thrust into the dialer, the wheels 66 and 68 rotate to load the helical spring 74 for driving the card transport mechanism. The hub 76 and the bent arms 78 and 80 are rotated with the wheels 66 and 68, the bent arm 80 being removed from the riser 176 to permit operation of the push bar assembly.

When the encoded card is fully inserted into the dialer, the pawl 84 engages the spring-loaded latch or notched bar 128 to prevent the spring 74 from driving the card out of the housing. Also, the sensing contacts *a* through *g* engage the first row of punched holes in the encoded card 20. As a result of the letter "F" or digit 3 encoded in the first row of the card, the sensing contacts *a* and *g* are operated causing the make sections thereof to close and the break section of the *g* sensing contact to be open. In this condition the dialer is ready to begin automatic operation.

Next, the customer depresses the push bar 24 (see FIG. 8) which operates the start switch 164 to connect the dialer circuit to the telephone circuit and disconnect the telephone set circuit from the telephone circuit. As a consequence, coil 188 of the pulser assembly is connected in series with the ring line, the armature 190 elevating due to the energized coil. In rising, the armature opens the break contact 193 and closes the make contact 192. The elevation of the armature also causes the notched wheel 198 to rotate the cams 206 through 212 from the "0$^{th}$" discrete position or start position to the first discrete position, as shown in FIG. 6A. In this position the make contact and the break contact of the $\overline{on}$ cam are open and closed, respectively. This setting of the $\overline{on}$ cam completes a current path about the pulser contact 193 to obliterate the pulsing action thereof, the path extending from ring line through the pulser contact 192 to the $\overline{on}$ break contact, thence through the resistor 219 and the start switch 164 to the tip side.

Operation of the pulser contact 193 disconnects the coil 188 from the ring line, the armature being released and returning to the normal position engaging the stop 191 (see FIG. 6) where it recloses the pulser contact 193 and opens the pulser contact 192. The closure of the pulser contact 193 again connects the coil 188 to the ring line, the armature 190 being elevated to rotate the cam assembly to the second discrete position and open the pulser contact 193. Again the pulsing action of the pulser contact 193 is obliterated since the second discrete position of the cam assembly is the same as the first discrete position.

On the third operation of the armature 190, the cam assembly is advanced to the third discrete position, the $\overline{on}$ contacts transferring to close the make section and open the break section thereof. The third setting of the cam assembly breaks the closed current path about the pulser contact 193, which was previously described. Since the cam-operated contacts do not correspond to the operated sensing contacts $a$ and $g$ and the break section of the $g$ contact is open, no current path exists about the pulser contact 193. The ring circuit is thereby interrupted to produce the appearance of a first pulse on the ring line.

The fourth operation of the armature 190 advances the cam assembly to the fourth discrete position. At this position the cam-operated contacts $\overline{a}$ and $\overline{e}$ are closed. Again a current path about the pulser contacts 193 is not completed since the combination of closed cam-operated contacts is still different from the combination of closed sensing contacts $a$ and $g$; the break section of the $g$ contacts is still open; and, the $\overline{on}$ contacts are still operated. As a consequence, the pulser contacts 193 produce the appearance of a second pulse on the ring line. For similar reasons, a current path is not completed about the pulser contacts 193 at the fifth setting of the cam assembly, the pulser contacts producing the appearance of a third pulse on the ring line.

At the sixth discrete position of the cam assembly, the cam operated contacts $\overline{a}$ and $\overline{g}$ are closed, the closed cam-operated contacts $\overline{a}$ and $\overline{g}$ corresponding to the closed sensing contacts $a$ and $g$. As a result, a current path is completed through the matrix before a fourth pulse is transmitted on the ring line. The control relay 104 operates on completion of the current path through the matrix, the control relay circuit forming a closed current path about the pulser contact.

At the seventh through the thirteenth discrete position the closed cam-operated contacts do not correspond to the operated sensing contacts. The matrix remains closed, however, due to the operated condition of the control relay. To prevent the matrix from being open when the cam-operated contacts are changed, the control relay is selected to have an operating time which permits operation thereof while the make contacts 192 are closed. The control relay is also selected to have a slow release time so that the matrix does not open while the make contacts 192 are opened.

The control relay circuit remains closed and obliterates the pulsing action of the pulser contacts 193 until the $\overline{on}$ contact operates which occurs at the thirteenth setting of the cam assembly. As previously described, the operated $\overline{on}$ contacts also obliterate the pulsing action of the pulser contacts during the 13th, 0th, 1st and 2nd positions or interdigital time of the cam assembly.

The card transport mechanism operates during the interdigital time to advance the second encoded row of the card before the sensing contact. At the thirteenth discrete position or setting of the cam assembly, the escapement cam 140 is rotated into contact with the latch or notched bar 128. At the 0th or next discrete position of the cam assembly, the escapement cam urges the notched bar away from the pawl 84. The release of the pawl enables the spring 74 to drive the card transport mechanism which advances the card 20 until the pawl reengages the latch at the end of a revolution, the latch returning to the normal position before the pawl completes a revolution as the escapement on the next setting of the cam assembly is moved past the latch. During the rotation of the pawl, the second row of the encoded card is brought into alignment with the sensing contact assembly, the contacts $c$ and $e$ thereof being operated to indicate the letter R or number 7.

The pulser assembly then begins to repeat the process of matching the cam-operated contacts to the sensing contacts. On the 10th setting of the cam assembly, the cam-operated contacts match the sensing contacts. As previously described a current path is completed through the matrix, and the control relay circuit operates to obliterate the pulses of the pulser contacts 193 until the cam assembly returns to the thirteenth setting thereof. It is believed apparent, therefore, that each row of the encoded card will be inspected by the sensing contacts as the card is advanced out of the dialer.

In the case of the number "0," which is the last digit of the encoded telephone number, only one hole is punched in the card, the hole being positioned to operate the $d$ sensing contact. The pulser does not include a $\overline{d}$ contact which permits the pulser contacts 193 to produce the appearance of a pulse on the ring line ten times as the cam assembly is advanced from the 2nd to the 13th setting.

Thus, it is believed apparent that the sensing contacts and the pulser assembly function as a translation means to translate the encoded letter or digit of the card 20 into corresponding electrical pulses.

After the last digit or "0" of the telephone number is translated into corresponding electrical signals and the cam assembly returns to the start position, the encoded card is freed from the dialer. The card transport mechanism in returning to the normal position causes the bent arm 78 to engage the movable arm 173 and operate the start switch 164 which disconnects the dialer circuit from the telephone circuit. Simultaneously, the bent arm 80 is rotated into the notch 180 of the riser 176 to lock the push bar 24 against movement. In this condition, the telephone set is now connected to the telephone circuit and the subscriber may converse with the called party after the central office equipment completes the connections for the dialed number.

In the event that the subscriber has selected an improper card for the subscriber desired to be called, such a card may be released from the dialer before or after actuation of the push bar. The improper card is released by depressing the releasing bar 86, the arm section 150 thereof withdrawing the notched bar 128 from the pawl 84 to permit the helical spring 74 to drive the improper card out of the dialer.

*A.C. Dialer*

Figure 11:
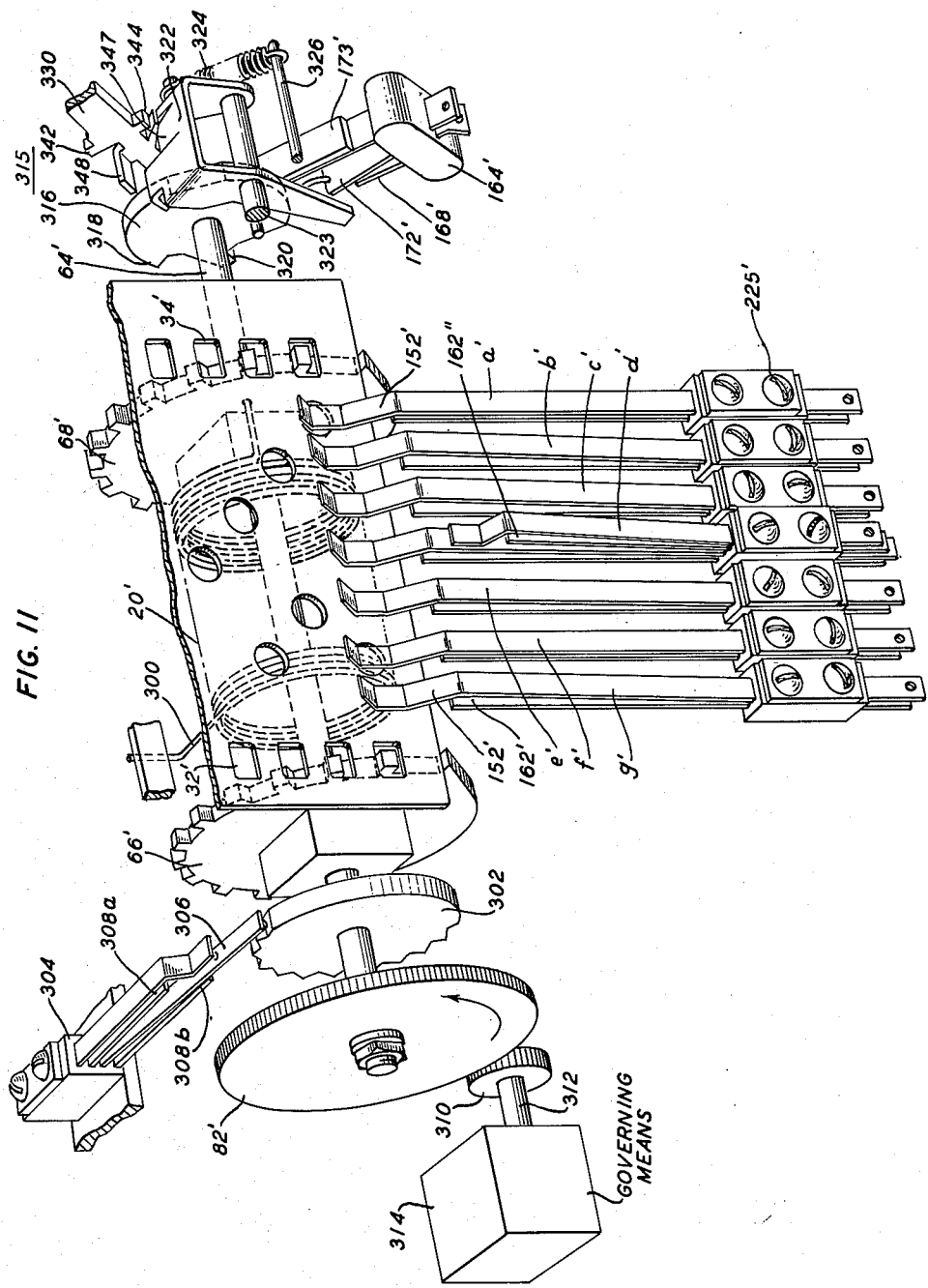
FIG. 11 is an exploded view illustrating the cooperation of the card transport mechanism, governing means, sensing contacts, push button device and start switch of a call transmitter adapted for multi-frequency or A.C. pulsing.
Figure 12:
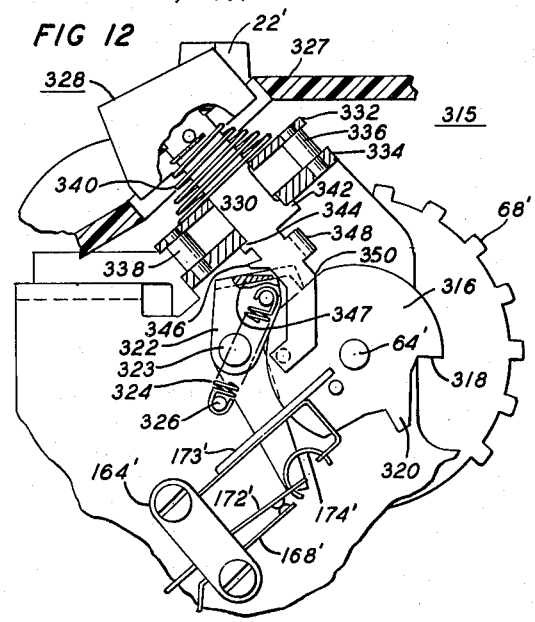
FIG. 12 is a portion of FIG. 11 showing the normal position of the push button device included in FIG. 11, said device controlling the operation of the card transport mechanism shown therein.

The A.C. or multifrequency dialer shown in FIGS. 11 through 13 is a converted D.C. dialer. The structural details of the A.C. dialer, as shown in FIG. 11, are substantially the same as those for the D.C. dialer. As a consequence, corresponding parts of the A.C. and D.C. dialers are designated by the same reference designation except that the former are primed numbers whereas the latter are unprimed numbers.

The A.C. dialer card sensing contact assembly includes seven contacts designated $a'$ through $g'$, each contact having a follower 152' and a single make contact 162' except the d' contact which has first and second make contacts designated 162' and 162", respectively, for reasons which will be more apparent hereinafter. The sensing contacts are individually mounted in insulator blocks 225' which are suitably secured to a mounting plate 62' (not shown). The A.C. dialer sensing contacts are normally open when the follower is in contact with the encoded card. When the follower slips into a hole of the encoded card, the contact associated therewith is operated to complete an electrical circuit. A more complete explanation of the sensing contact assembly will be given in connection with the electrical circuit shown in FIG. 13.

The A.C. dialer card transport mechanism comprises a shaft 64' suitably mounted in the side plates 42' and 44' (not shown), the shaft having mounted thereon toothed wheels 66' and 68' for engaging the encoded card 20'. The shaft is driven by a helical spring 300 positioned between the toothed wheels, one end of the spring being suitably secured to the dialer housing and the other end of the spring being secured to the toothed wheel 68'. A cam wheel 302 mounted on the shaft engages a contact assembly 304 including a make contact 306 and a two section break contact 308a and 308b, respectively. The cam includes projections thereon causing the make and break contacts to close and open, respectively. A drive gear 82' engages a pinion 310 having a shaft 312 which connects to a conventional governing means 314. The speed of the shaft 64' when driven by the helical spring 300 is regulated by the governing means 314.

Also mounted on the shaft 64' is a cam wheel 316 having a first projection 318 and a second projection 320. A follower 322 journaled on a rod 323 secured to the side plate 44' (not shown) rides on the cam 316. The follower is spring loaded by a helical spring 324 connected at one end to a pin 326 secured to the side plate 44' (not shown). The follower is part of a latching mechanism which will be described in connection with FIGS. 12, and 12A through 12C. The latching mechanism of the A.C. dialer replaces the push bar mechanism (see FIGS. 6 and 7) of the D.C. dialer which is disassembled and removed from the A.C. dialer. Also the cover 40 (see FIG. 1) of the D.C. dialer is removed and replaced by a modified cover 327 (FIG. 12) which includes an aperture therein to accommodate a push button assembly 328 which is part of the latching mechanism.

In the latching mechanism, as shown in FIG. 12, the push button 328 is fastened to a push rod 330, the rod extending through slotted guide discs 332 and 334 which are separated by spacers 336 and 338. The disc 332 serves as a mounting base for a spring 340 which biases the push rod and button to an upward position limited by detents 342 and 344 included in the push rod. The push rod also includes a lip 346 which cooperates with the follower 322 as will be described hereinafter. A bent arm section 348, included in the push rod, acts as a limit stop for the push rod to prevent the push button from being operated when the cam 316 is in the normal position as shown in FIG. 12. Cooperating with the push rod is the start switch 164' having a fixed contact 168', a transfer member 172', a movable arm 173' and a bowed spring 174' which interconnects the movable arm 173' and the transfer member 172'.

Figure 12A:
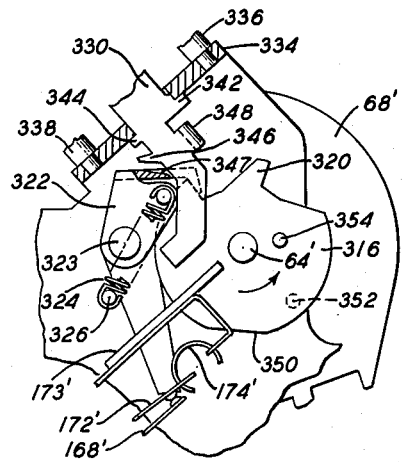
FIG. 12A shows the push button mechanism of FIG. 12 preventing the card transport mechanism from rotating after the mechanism has been loaded with an encoded card.
Figure 12B:
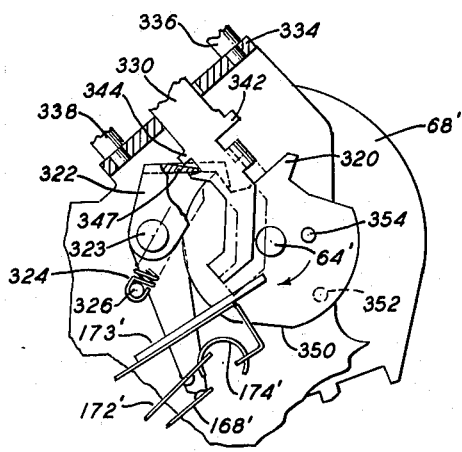
FIG. 12B shows the release of the card transport mechanism and the transfer of the start switch on operation of the push button of FIG. 12.
Figure 12C:
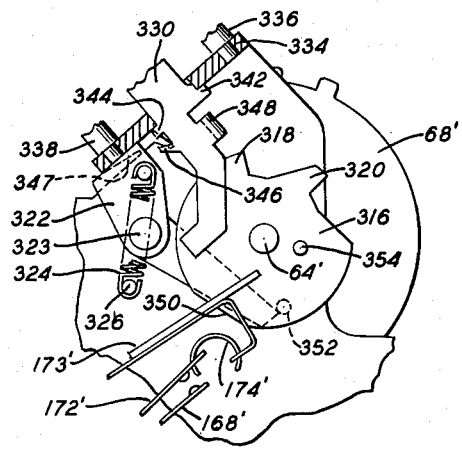
FIG. 12C shows the card transport mechanism returning to the normal position and resetting a follower mechanism of the push button shown in FIG. 12.

The normal position of the latching mechanism is shown in FIG. 12 and occurs before an encoded card is inserted into the card slot 22'. In the normal position of the latching mechanism, the follower rests on a flat 350 of the cam and the lip 346 of the push rod 330 lies above the follower. When a card encoded with a seven digit telephone number is inserted into the dialer, the cam wheel, as shown in FIG. 12A, is rotated in a counterclockwise direction until the projection 318 snaps behind the point of the follower. For cards encoded with ten digit subscriber numbers, the projection 320 also snaps behind the point of the follower. In either position the cam wheel 316 and the card transport mechanism are prevented from rotating in a clockwise direction. On actuation of the push button 328, the push rod 330 operates the movable arm 173' of the start switch 164', as shown in FIG. 12B, the transfer member 172' thereof shifting away from the fixed contact 168'. The push rod, when depressed, is urged away from the follower by the opposition of the profile of the lip 346 against an indented edge 347 included in the follower. On release of the button the lip 346 picks up the indented edge 347 of the follower to remove the point of the follower from the projection 318 thereby freeing the cam wheel 316 for rotation. The follower 322 is held upright and away from the push rod by means of the toggle action of the spring 324 as shown in FIG. 12C. The cam wheel in rotating clockwise to the normal position (see FIG. 12) resets the follower 322 and start switch 164' by means of pins 352 and 354, respectively, attached to the cam wheel. The pin 352 drives the tail of the follower to overcome the toggle action of the spring 324 and return the follower to the normal position. The pin 354 engages the movable arm 173' to cause the transfer contact to return to the normal position or engage the fixed contact 168'.

*Electrical Circuit*

The electrical circuit of the A.C. dialer will be described in conjunction with FIG. 13. The dialer circuit comprises a card dialer circuit and a telephone substation circuit, each circuit being blocked out in dot and dash lines. As in the case of the D.C. dialer, the telephone substation is a conventional instrument as described in United States Patent 2,629,783 to H. F. Hopkins, issued February 24, 1953. However, pulsing contacts 353 included in the substation are either open circuited or removed since such contacts are not suitable for use in an A.C. or frequency pulsing system. The A.C. card dialer is also operable with a telephone substation adapted for A.C. pulsing shown in the United States Patent application of L. A. Meacham and L. Schenker, Serial No. 759,474 filed September 8, 1958 and assigned to the assignee of the present invention. The telephone substation circuit is connected to a telephone circuit including a ring (r), a tip (t) and a ground (g) line which originate from a central office.

The card dialer circuit includes a two-frequency transistor oscillator which comprises a transistor 356, mutually coupled inductances X, Y and Z, and X", Y" and Z", capacitors 358 and 360, limiting diodes 362 and 364, a voltage regulator diode 366 and a load resistor 367. The cooperative relationship of the oscillator components and the operation thereof are also described in United States Patent application Serial No. 759,474 cited above.

The inductances X and X" are tapped at four positions and three positions, respectively. The inductance X which includes tapped points $X_1$, $X_2$, $X_3$, $X_4$ and the capacitor 358 form a first tank circuit, the tapped points $X_2$, $X_3$, $X_4$ being connected to the front contact of the sensing contacts e', f' and g', respectively. The tapped point $X_1$ is connected to the front contact of one of the make sections included in d' contact. The back contacts of the sensing contacts d', e', f' and g' are multiplied together and connected to one side of the capacitor 358, the other side of which is connected to the inductor. Similarly, the inductance X", which includes tapped points $X_1''$, $X_2''$, $X_3''$ and the capacitance 360, forms a second tank circuit, the tapped points $X_1''$, $X_2''$, $X_3''$ being connected to the front contact of the sensing contacts a', b' and c', respectively. The tapped point $X_3''$ is also connected to the other make section included in the d' contact. All of the back contacts of the sensing contacts a', b', c' and the second section make contact included in the d' sensing contact are multiplied together and connected to one side of the capacitor 360, the other side of the capacitor 360 being connected to the inductance X″ to complete the second tank circuit.

At this stage it should be pointed out that in FIG. 13 the sensing contacts a′ through g′ are shown for the condition when an encoded card is not inserted into the dialer. When a card is inserted into the dialer, all the sensing contacts open until the follower of a contact slips into a code hole of the card whereupon that contact closes.

Normally, the first and second tank circuits are connected in series with the ring circuit by means of the break switches 308a and 308b, these switches together with the make switch 306 being actuated by the cam 302 included in the card transport mechanism (see FIG. 11). Also, the multi-frequency oscillator is normally short circuited by the path from the diode 366 to the switch 308b and back to the collector terminal of the transistor. When the switches 308 and 306 transfer, the short is removed across the oscillator provided the start switch 164′ is open. Simultaneously, the tank circuits are disconnected from the ring line, the oscillator thereby being shocked into operation.

A.C. Dialer Operation

The A.C. dialer is operated by the subscriber removing the handset of the telephone instrument and inserting the proper encoded card into the card slot 22′ (see FIG. 1). For purposes of description, the card inserted into the dialer is that shown in FIG. 2. As the card is depressed into the housing, the helical spring 300 is loaded to drive the card transport mechanism which is held in a locked condition by the latching mechanism 315. Next, as shown in FIG. 12B, the subscriber depresses the push button 328 which operates the start switch 164′ to connect the dialer circuit to the ring line as previously explained. The push button in returning to the normal position raises the follower above the cam wheel 316 which releases the card transport mechanism for operation, the shaft and toothed-wheel assembly thereof rotating to drive the encoded card out of the dialer. As the card is driven out of the dialer by the card transport mechanism, the coding in each row is arranged to operate sensing contacts which select a frequency in each tank circuit. For any encoded number the frequencies selected in the tank circuits are peculiar to that number and no other number. Thus, in the case of the first digit "F" of the telephone number FR 7–2270 encoded in the card, the sensing contacts a′ and g′ operate to select the frequencies developed by the inductance-capacitance combination $X_4C$ and $X_1''C$. For the second digit "R" of the encoded telephone number, the sensing contacts c′ and e′ operate to select the frequencies developed by the inductance-capacitance combinations $X_2C$ and $X_3''C$. The last digit "0" of the encoded telephone number operates the sensing contact d′ only, which selects the frequencies developed by the inductance-capacitance combinations $X_1C$ and $X_3''C$. Thus, each number or letter included in a telephone number is represented by a unique set of frequencies.

Before each row of the encoded card is inspected by the sensing contacts, the cam wheel 302 included in the card transport mechanism is rotated to a position to close the break contacts 308a and 308b and open the make contact 306. As a consequence the tank circuits are connected to the ring line and the two-frequency oscillator is short circuited to prevent operation thereof. When the sensing contacts engage the code holes of a row and select a set of frequencies in the tank circuits corresponding to the number encoded in the row, the cam wheel 302 is rotated to another position to open the break contacts 308a and 308b and close the make contact 306. The operation of the contacts 306, 308a and 308b interrupts the flow of current through the tank circuits and removes the short circuit across the oscillator. On interruption of the tank circuit current, the two selected frequencies in the tank circuit are magnetically coupled into the transistor circuit through the mutually coupled inductances X, Y and Z, and X″, Y″ and Z″ and the oscillator is shocked into operation, the two frequencies of the oscillator being transmitted over the telephone circuit to the central office for operation of the switching equipment therein. The details of the oscillator's operation are more fully explained in United States patent application Serial No. 759,474 cited above.

Thereafter the card transport mechanism rotates the cam wheel to a position to again set the contacts 306, 308a and 308b to short circuit the oscillator and connect the tank circuits to the ring line before the next row of the encoded card is inspected by the sensing contacts. Following this position the cam wheel is rotated to re-operate the contacts 306, 308a and 308b and remove the short circuit across the oscillator and disconnect the tank circuits from the ring line while the next encoded row of the card is being inspected by the sensing contacts. Thus, it can be seen that the cam wheel is shaped to include a series of projections which operate the contacts 306, 308a and 308b in sequence with each inspection of an encoded row of the card by the sensing contacts.

The governing means 314 is arranged to regulate the speed of the card transport mechanism to permit the proper sensing of each row of the encoded card by the sensing contacts.

After the last row of the card is sensed, the latching mechanism 315 and the start switch 164′ are reset by the pins 352 and 354, respectively, as previously explained in connection with the description of FIG. 12C. Operation of the start switch disconnects the dialer from the telephone circuit and the subscriber is able to converse with the called party after the central office equipment completes the connections for the dialed number.

In the event that the subscriber inserts an improper card into the dialer, the card is released by first hanging up the handset and depressing the push button 328. Failure to hang up upon release of the card will result in the improper number being dialed by the dialer.

Thus, it can be seen that the present invention provides an automatic dialer which is compact and easily connected to station facilities of a subscriber. The operation of the dialer is rapid, accurate and efficient and requires no special instruction to the subscriber to operate the dialer. Moreover, both A.C. and D.C. dialers do not require an outside supply of electric power, each being adapted to be energized from the power supplied over the telephone circuit. Finally, the dialer is suitable for use with either seven or ten digit telephone numbers as well as being readily convertible for A.C. or D.C. pulsing.

Numerous other embodiments of the present invention may be devised by those skilled in the art without departing from the spirit and scope of the present invention.

What is claimed is:

1. A call transmitter for calling any one of the subscribers in a telephone system by means of a card having each digit of the telephone number of the subscriber to be called encoded thereon in a seven element code representation, the card having two spaced columns of sprocket holes, the call transmitter comprising a plurality of switches, seven sensing members engaging the encoded card and actuating selected ones of the switches responsive to the coding on the card, a pair of spaced sprocket wheels for engaging the columns of the sprocket holes in the card, a motor spring coupled to the sprocket wheels, a passageway for directing the card into engagement with the code sensing members and directing the columns of sprocket holes in the card into engagement with the sprocket wheels, the manual insertion of the card into the passageway rotating the sprocket wheels to store energy in the motor spring, the energized motor spring biasing the sprocket wheels to move the card through the passageway, means under the control of the actuated switches for generating electrical signals representing the digits of the encoded telephone number, switching means for connecting the signal generating means across a telephone line connected to a source of electrical power, and operating means for actuating the switching means and enabling the movement of the card from the passageway by the sprocket wheels, the signal generating means being operated solely on power received from the telephone line and transmitting signals out on the telephone line.

2. A call transmitter for calling any one of the subscribers in a telephone system by means of a code bearing member having each digit of the telephone number of the subscriber to be called encoded thereon in an M out of N element code representation where M is an integer less than three and N is an integer less than eight, the call transmitter comprising a plurality of switches, N sensing members for engaging the code bearing member and actuating selected ones of the switches responsive to the coding on the member, means for moving the code bearing member, the moving means including a spring member, a passageway for directing the code bearing member into engagement with the code sensing members and the moving means, the insertion of the code bearing member into the passageway operating the moving means to store energy in the spring member, the energized spring member biasing the moving means to move the code bearing member through the passageway, means under the control of the actuated switches for generating electrical signals representing the digits of the encoded telephone number, switching means for connecting the signal generating means across a telephone line connected to a source of electrical power, and operating means for actuating the switching means and enabling the movement of the code bearing member from the passageway by the moving means, the signal generating means being operated solely on power received from the telephone line and transmitting signals out on the telephone line.

3. A call transmitter for a telephone substation including a speech path and means for connecting the call transmitter and the speech path across a telephone line connected to a source of electrical power, the call transmitter being responsive to a code bearing member having each digit of a number to be called encoded thereon in an M out of N code representation where M is an integer less than N and N is an integer less than ten, the call transmitter comprising a plurality of switches, N sensing members for actuating selected ones of the switches responsive to the coding on the code bearing member, means for moving the code bearing member, the moving means including a spring member, the insertion of the code bearing member into engagement with the moving means operating the moving means to store energy in the spring member, the energized spring member biasing the moving means to move the code bearing member past the sensing members, means under the control of the actuated switches for generating electrical signals representing the digits of the encoded telephone number, and switching means for disabling the speech path and enabling the signal generating means during the signaling of each digit, the signal generating means being operated solely on power received from the telephone line and transmitting signals out on the telephone line.

4. A call transmitter for a telephone substation including a speech path and means for connecting the call transmitter and the speech path across a telephone line connected to a source of electrical power, the call transmitter being responsive to a code bearing member having each digit of a number to be called encoded thereon, the call transmitter comprising a plurality of switches, sensing means for actuating selected ones of the switches responsive to the coding on the code bearing member, means for providing relative movement between the code bearing member and the sensing means to sequentially present each encoded digit to the sensing means, means under the control of the actuated switches for generating electrical signals representing the digits of the encoded telephone number, and switching means for disabling the speech path and enabling the signal generating means during the signaling of each digit, the signal generating means being operated solely on power received from the telephone line and transmitting signals out on the telephone line.

5. A call transmitter for calling any one of the subscribers of a telephone system by means of a code bearing medium having each digit of a telephone number of the subscriber to be called encoded thereon, the call transmitter comprising switching means actuated responsive to the coding on the code bearing medium, means for providing relative movement between the switching means and the code bearing medium whereby the switching means sequentially scans each digit encoded on the code bearing medium, a multifrequnecy signal generating means comprising a resonant circuit capable of resonating at discrete frequencies selected by the actuated switching means and amplifying means for sustaining the resonating of the resonant circuit at the selected frequencies, and means for connecting the signal generating means across a telephone line connected to a source of electrical power, the signal generating means being operated solely on power received from the telephone line and transmitting signals out on the telephone line.

6. A call transmitter for a telephone substation including a speech path and means for connecting the call transmitter and the speech path across a telephone line connected to a source of electrical power, the call transmitter being responsive to a code bearing medium having each digit of a telephone number encoded thereon, the call transmitter comprising first switching means actuated responsive to the coding on the code bearing medium, means for providing relative movement between the first switching means and the code bearing medium whereby the first switching means sequentially scans each digit encoded on the code bearing medium, a multifrequency signal generating means comprising a resonant circuit capable of resonating the discrete frequencies selected by the actuated first switching means and amplifying means for sustaining the resonating of the resonant circuit at the selected frequencies, and second switching means for disabling the speech path and enabling the signal generating means during the signaling of each digit, the signal generating means being operated solely on power received from the telephone line and transmitting out on the telephone line.

7. A call transmitter for a telephone substation including a speech path and means for connecting the call transmitter and the speech path across a telephone line connected to a source of electrical power, the call transmitter being responsive to a code bearing medium having each digit of a telephone number to be called encoded thereon in an M out of N element code representation where M is an integer less than N and N is an integer less than ten, the call transmitter comprising a plurality of switches, N sensing members for sensing the coding on the code bearing medium, means for transporting the code bearing medium relative to the code sensing members, each encoded digit on the code bearing medium causing the code sensing members to actuate selected ones of the switches, a multifrequency signal generator comprising a pair of resonant circuits capable of resonating at discrete frequencies selected by the actuated switches and an amplifying means coupled to the resonant circuits in such manner as to sustain the resonating of the resonant circuits at the selected frequencies, and switching means for enabling the signal generating means and disabling the speech path during the signaling of each digit, the signal generating means being operated solely on power received from the telephone line and transmitting signals out on the telephone line.

8. A call transmiter responsive to a code bearing member having each digit of a number to be called spacedly encoded thereon, the call transmitter comprising a multifrequency signal generator including a pair of resonant circuits adapted to resonate at discrete frequencies and an amplifying means coupled to the resonant circuits in such manner as to sustain the resonating of the resonant circuits, switching means for connecting the signal generator across a telephone line, a plurality of pairs of contacts for selecting discrete frequencies of the resonant circuits, each pair of frequency selecting contacts being associated with an individual frequency, code sensing elements associated with the pairs of frequency selecting contacts for actuating the contacts responsive to the coding on the code bearing member, means for moving the code bearing member past the code sensing elements, a start member for initiating the operation of the moving means, the actuation of the start member operating the switching means to connect the signal generator across the telephone line and the movement of the code bearing member past the code sensing elements causing periodic actuation of the code sensing elements.

References Cited in the file of this patent

UNITED STATES PATENTS

| | | |
|---|---|---|
| 2,095,298 | Tauschek | Oct. 12, 1937 |
| 2,561,298 | Ghels | July 17, 1951 |
| 2,567,812 | Hickman | Sept. 11, 1951 |
| 2,760,005 | Williamson | Aug. 21, 1956 |
| 2,966,557 | Schmitt | Dec. 27, 1960 |
| 2,988,603 | Kumagai | June 13, 1961 |
| 3,025,358 | Hymel | Mar. 13, 1962 |

FOREIGN PATENTS

| | | |
|---|---|---|
| 1,020,372 | Germany | Dec. 5, 1957 |